United States Patent [19]

Carlsson

[11] Patent Number: 5,022,605
[45] Date of Patent: Jun. 11, 1991

[54] DETACHABLE TRIGGER MECHANISM IN AN OPEN-FACE FISHING REEL OF THE FIXED-SPOOL TYPE

[75] Inventor: Karl L. Carlsson, Asarum, Sweden

[73] Assignee: ABU Garcia Produktion AB, Svangsta, Sweden

[21] Appl. No.: 477,018

[22] Filed: Feb. 8, 1990

[51] Int. Cl.⁵ ............................................. A01K 89/01
[52] U.S. Cl. .................................................. 242/233
[58] Field of Search ............................... 242/232, 233

[56] References Cited

U.S. PATENT DOCUMENTS 3,226,873  1/1966  Wood .................................. 242/233
4,941,626  7/1990  Carlsson ............................. 242/231

Primary Examiner—Daniel P. Stodola
Assistant Examiner—C. Riggs
Attorney, Agent, or Firm—Browdy and Neimark

[57] ABSTRACT

An open-face fishing reel of the fixed-spool type has a rotor, a line spool, a bail for winding a line onto the line spool, and a detachable trigger mechanism. Two mounting elements supporting the bail are so rotatably mounted each on one attachment on the rotor that the bail is pivotal between a folded-in line-winding position and a folded-out position in which it is released of the line. The trigger mechanism has a support element releasably mounted on one of the attachments and carrying a pin on which a trigger is mounted for pivotal movement between a first position and a second position. A driver eccentrically engages the mounting element mounted on the above-mentioned attachment. A cam is arranged on the trigger in order, during the pivotal movement of the trigger from the first position to the second position and in cooperation with the driver, to turn the mounting element from its position of rotation corresponding to the folded-in line-winding position of the bail, to its position of rotation corresponding to the folded-out position of the bail.

4 Claims, 4 Drawing Sheets

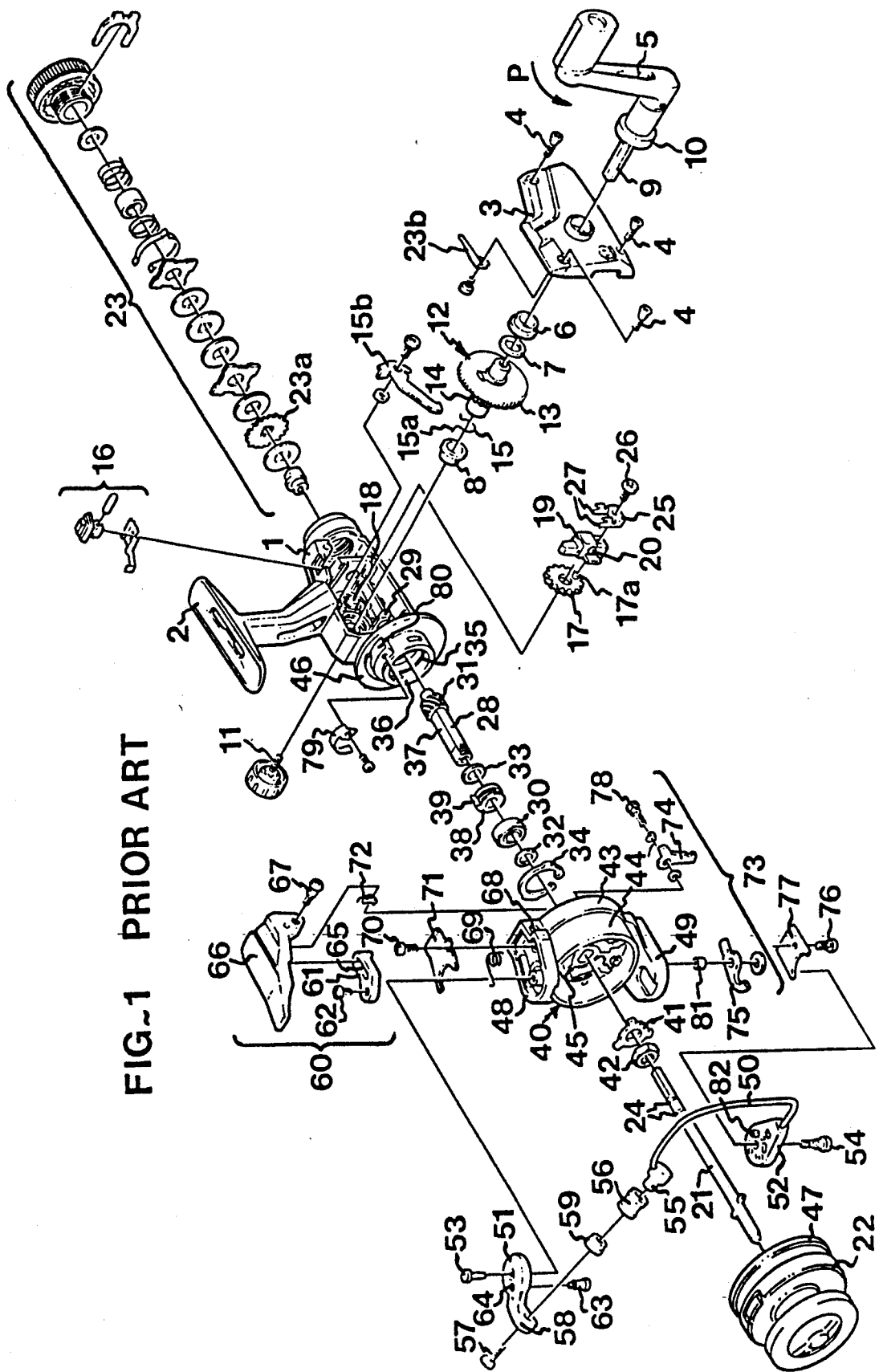
FIG._1 PRIOR ART

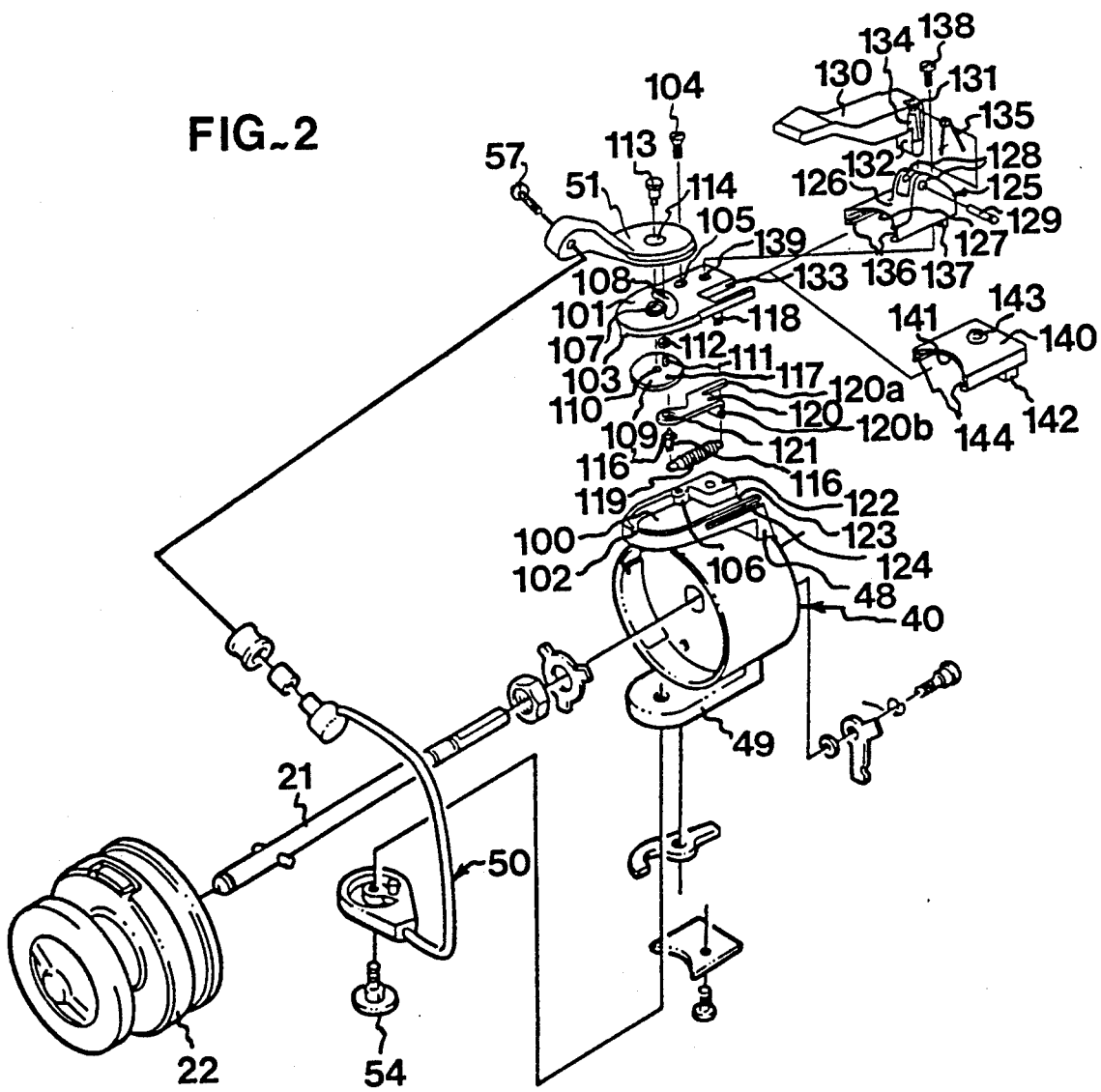
FIG._2

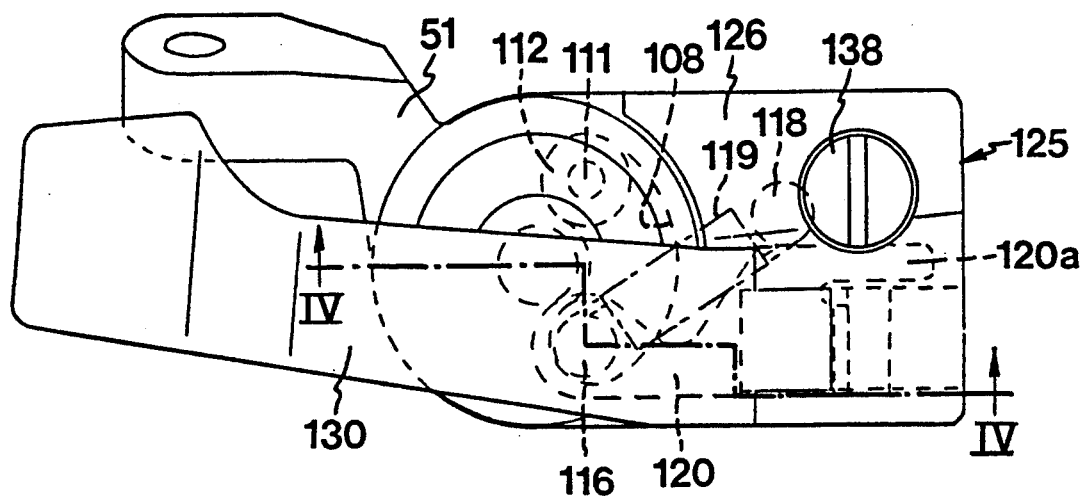
FIG._3
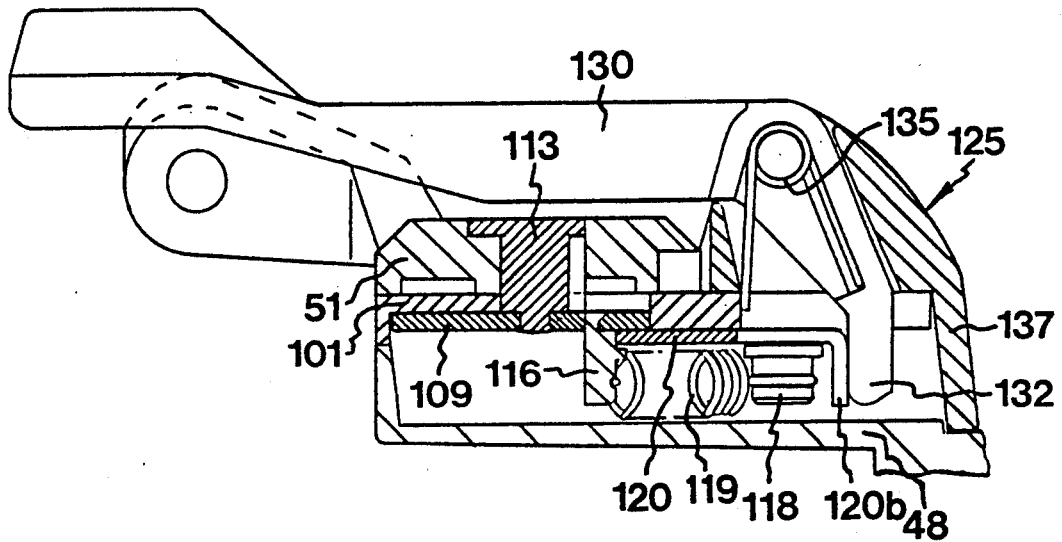
FIG._4
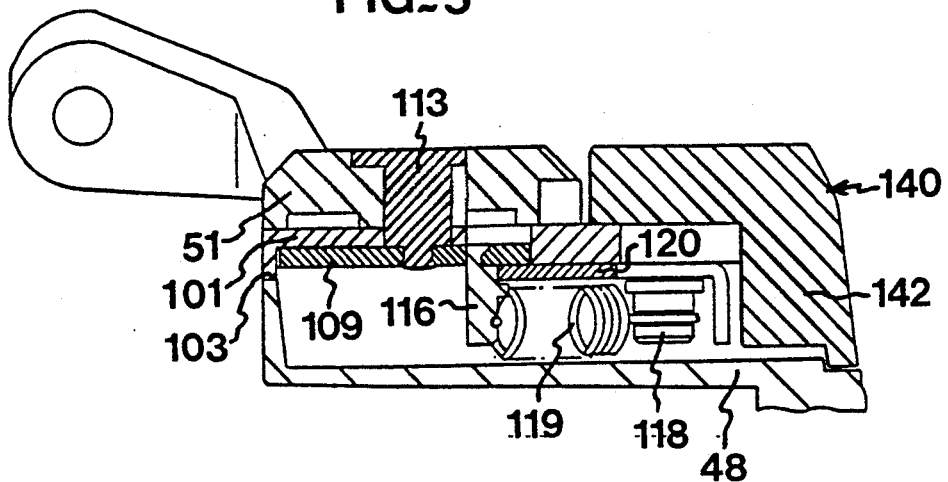
FIG._5

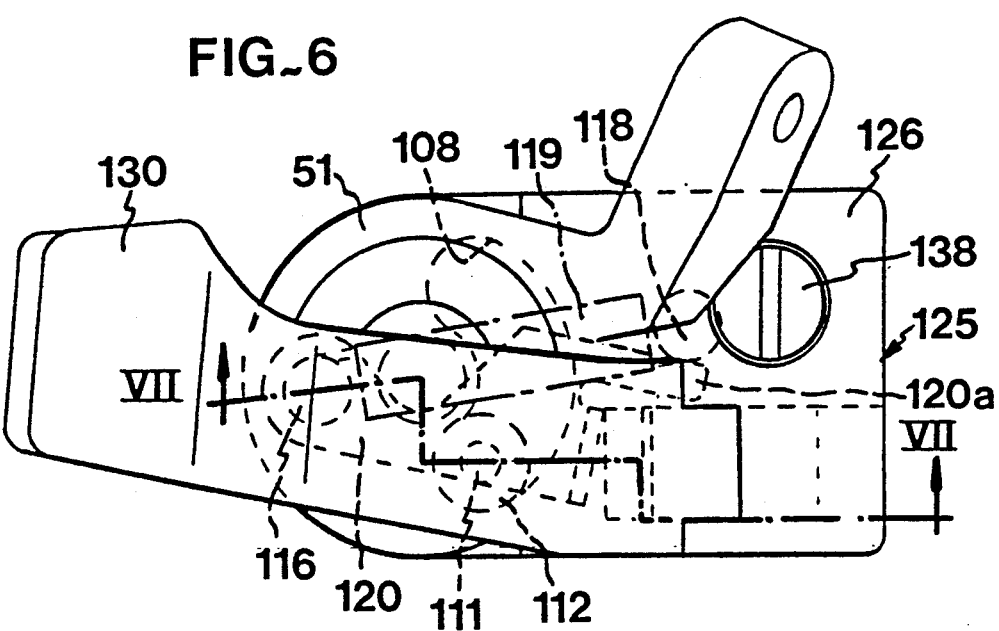
FIG._6
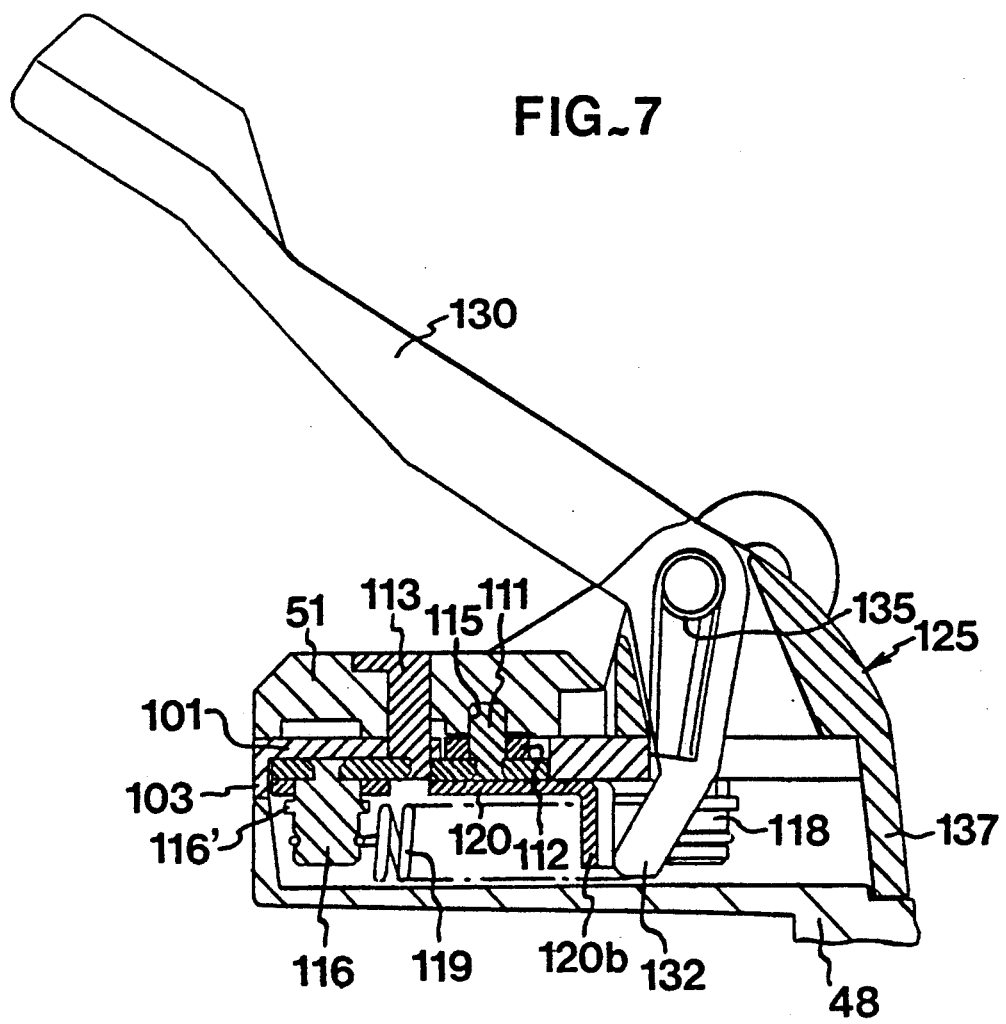
FIG._7

DETACHABLE TRIGGER MECHANISM IN AN OPEN-FACE FISHING REEL OF THE FIXED-SPOOL TYPE

FIELD OF THE INVENTION

The present invention relates to a trigger mechanism in an open-face fishing reel of the fixed-spool type.

DESCRIPTION OF THE PRIOR ART

Prior art fishing reels of this type have a spindle rotatably and axially displaceably mounted in a housing and carrying a line spool at one end thereof. The line spool is non-rotatably connected to the spindle and axially fixed thereon. A drive shaft extending at right angles to the spindle is mounted in the housing to be rotated by means of a handle. Oscillating means are connected to the drive shaft and the spindle. When the handle is rotated for retrieving a fishing line fixed on the line spool, the drive shaft rotates and drives the oscillating means, in turn oscillating the spindle and, thus, the line spool in the longitudinal direction of the spindle. Through a gear transmission provided in the housing, the handle drives a hollow shaft which projects from the housing and is coaxial with the spindle extending through the shaft. The hollow shaft then drives a rotor non-rotatably mounted thereon and carrying a bail mechanism for winding the line onto the line spool. During line retrieve, the line is thus wound onto the line spool which, as opposed to the rotor, does not rotate, but instead executes an axial oscillatory movement. In this manner, the line will be distributed across the line spool.

The bail mechanism has a bail for winding the line onto the line spool and two attachments provided on the rotor diametrically opposite each other. At its ends, the bail is pivotally fixed to the attachments by means of mounting elements. To permit pivotal movement of the bail, the mounting elements are rotatably connected to the attachments by screws forming a bail pivot shaft at right angles to the spindle. The bail is pivotable between a folded-in line-winding position in which it extends substantially at right angles to the spindle, and a folded-out position in which it is located on the opposite side of the spindle and makes an angle therewith which is of the order of 45°. The bail is maintained in its two positions by a spring arranged in one of the attachments underneath a cover plate fixed thereon. The bail can be pivoted to the folded-out position before a cast by means of a trigger mechanism mounted on one attachment and engaging one of the mounting elements.

A known trigger mechanism has an angle arm, one shank of which is rotatably connected to the mounting element and the other shank of which has a longitudinal groove. The trigger mechanism further has a trigger pivotally connected to the attachment by means of a screw screwed in one side wall of the attachment. On its side facing the attachment, the trigger has a projection engaging in the longitudinal groove. When the trigger is pivoted, e.g. with the index finger, a short distance away from the attachment about its axis defined by the screw, the mounting element is turned in such a direction that the bail is pivoted to the folded-out position. When the trigger is released, it is returned to its initial position by a spring, the projection of the trigger running freely in the groove without returning the mounting element.

This known trigger mechanism thus is made up of a plurality of components and therefore is rather complicated to mount and dismount, which is a considerable drawback since some fishermen wish to have a fishing reel with a trigger mechanism and others a fishing reel without any such mechanism. Therefore, two different fishing reel variants of each basic embodiment are often manufactured today, namely one variant with and another variant without a trigger mechanism.

SUMMARY OF THE INVENTION

The object of the present invention is to overcome this drawback and provide a trigger mechanism which is so designed that it can be mounted on and dismounted from the fishing reel in an extremely convenient way.

According to the present invention, this object is achieved by means of a trigger mechanism in an open-face fishing reel of the fixed-spool type having a housing, a rotor mounted on said housing, a line spool coaxial with said rotor and adapted to oscillate in the axial direction, and a bail mechanism having a bail for winding a line onto said line spool, two attachments arranged on said rotor substantially diametrically opposite each other, and two mounting elements carrying said bail and being so rotatably mounted on a respective one of said attachments that said bail is pivotable about a bail axis substantially at right angles to the axis of said rotor, between a folded-in line-winding position and a folded-out position in which said bail is released of the line, at least one of said attachments being designed so as to form an open chamber and having a cover plate detachably mounted over said chamber and supporting the corresponding mounting element on its side facing away from said chamber, said trigger mechanism comprising a support element releasably mounted on said one attachment;

a trigger pivotally mounted on said support element about a pivot axis at right angles to the rotor axis and to the bail axis, to be pivoted between a first position and a second position, said support element and said trigger being detachable as a unit from said one attachment;

driver means eccentrically engaging the mounting element carried by said cover plate through a recess in the cover plate; and cam means provided on said trigger in order, during pivotal movement of the trigger from said first position to said second position and in cooperation with said driver means, to rotate said mounting element from its position of rotation corresponding to the folded-in line-winding position of said bail, to its position of rotation corresponding to said folded-out position of said bail.

BRIEF DESCRIPTION OF THE DRAWINGS

The invention will now be described in more detail with reference to the accompanying drawings, in which:

FIG. 1 is an exploded view showing a known open-face fishing reel of the fixed-spool type equipped with the known trigger mechanism briefly described above.

FIG. 2 is a partial exploded view showing an open-face fishing reel of the fixed-spool type equipped with a trigger mechanism according to the present invention, illustrating only the portion of the fishing reel which is of particular interest in the inventive context.

FIG. 3 is a top plan view showing the trigger mechanism in a first position.

FIG. 4 is a sectional view along the dash-dot line IV—IV in FIG. 3.

FIG. 5 is a sectional view corresponding to FIG. 4, but where the main part of the trigger mechanism has been replaced by a weight-compensating or counterbalancing plate.

FIG. 6 is a top plan view showing the trigger mechanism in a second position, and FIG. 7 is a sectional view along the dash-dot line VII—VII in FIG. 6.

The known open-face fishing reel of the fixed-spool type shown in FIG. 1 has a housing 1 with a foot 2 for securing the fishing reel on a fishing rod. The housing 1 has a side plate or cover 3 fixed to the housing by screws 4. A handle 5 is rotatably mounted in the cover 3 by means of a support bearing 6 and a bearing washer 7, and in the opposite side wall of the housing 1 by means of a support bearing 8. The shaft 9 of the handle 5 is axially fixed by means of a shoulder 10 on the handle side and a screw 11 with a knob-like head on the opposite side. The screw 11 is screwed in a threaded axial bore in the free end of the shaft 9. The shaft 9 has square cross-section throughout the major part of its length and non-rotatably carries a gear unit 12. The gear unit 12 comprises a driving gear 13 with axially directed teeth on its side facing away from the cover 3, and a smaller driving gear 14. Between the two driving gears 13 and 14, the unit 12 has a cylindrical portion (not shown) with an annular circumferential groove for receiving a spring 15. The spring 15 has an axially directed leg 15a cooperating with a pawl 15b pivotally fixed in the housing 1 so as to form a so-called silent anti-reverse which can be engaged and disengaged by means of a mechanism 16.

An oscillating gear 17 is mounted on a bearing pin 18 extending into the housing 1 from the wall thereof opposing the cover 3. The gear 17 meshes with the smaller driving gear 14 and has an axially directed eccentric pin 17a engaging in a vertical groove (not shown) in a driver element 19. The driver element 19 has a through bore 20 through which a spindle 21 extends. The spindle 21 is rotatably and axially displaceably mounted in the housing 1 and non-rotatably carries a line spool 22 on its end projecting from the housing 1. At its other end, the spindle 21 engages a brake mechanism 23, not described in more detail here, which comprises, inter alia, a toothed wheel 23a for cooperating with a click spring 23b fixed on the cover 3.

The spindle 21 has two annular circumferential grooves 24 between which the driver element 19 is mounted by means of a mounting element 25 fixed to the driver element 19 by a screw 26. The mounting element 25 has two legs 27 engaging in the grooves 24 in the spindle 21, such that the driver element 19 is axially fixed on the spindle 21 which is however rotatable relative to the driver element.

The spindle 21 also rotatably extends through a rotor shaft 28 considerably shorter than the spindle. The rotor shaft 28 is rotatably mounted in a support bearing (not shown) in an internal flange 29 in the housing 1 and in a ball bearing 30 in the end wall of the housing 1 opposite the brake mechanism 23. On its inner end, the rotor shaft 28 carries a gear 31 non-rotatably connected thereto and meshing with the larger driving gear 13. The ball bearing 30 is surrounded by two spacer washers 32 and 33 and maintained in place by a locking washer 34 engaging in an inner groove 35 in a sleeve 36 axially projecting from said end wall of the housing 1.

The rotor shaft 28 has two diametrically opposed planar surfaces 37 forming a so-called flat and non-rotatably carrying a ring 38 between the ball bearing 30 and the spacer washer 33. The ring 38 has a radial stop lug 39 for cooperating with the pawl 15b.

On its outer end, the rotor shaft 28 non-rotatably carries a rotor 40 secured to the rotor shaft by a locking washer 41 and a nut 42. The rotor 40 substantially has the form of a cylinder divided into two cylinder parts 43 and 44 by an inner wall 45. The cylinder part 43 surrounds an annular flange 46 radially projecting from the sleeve 36, and the cylinder part 44, having a smaller outer diameter than the cylinder part 43, is surrounded by a sleeve 47 axially projecting from the line spool 22.

The rotor 40 has two diametrically opposed attachments 48 and 49 integrally formed with the cylinder part 43 and extending axially over the cylinder part 44 at a certain radial distance therefrom. A bail 50 is pivotally fixed at its ends to the attachments 48 and 49 by means of mounting elements 51 and 52. To permit pivotal movement of the bail 50, the mounting elements 51 and 52 are rotatably connected to the attachments 48 and 49 by screws 53 and 54 forming a pivot shaft for the bail at right angles to the spindle 21. The bail 50 is pivotable between an operative folded-in position which is shown in FIG. 1 and in which it extends substantially at right angles to the spindle 21, and an inoperative folded-out position in which it is located on the opposite side of the spindle 21 and makes an angle therewith which is of the order of 45°.

A bearing pin 55 for a line roller 56 is fixed to one end of the bail 50. This end of the bail is connected to the mounting element 51 by a screw 57 extending through an arm 58 on the mounting element 51 and through a spacer sleeve 59 and screwed in the bearing pin 55.

When turning the handle 5 in the direction of line retrieve P, i.e. in the direction in which a fishing line (not shown) fixed to the line spool 22 is wound onto the line spool, the larger driving gear 13 drives the gear 31, such that the rotor 40 and, thus, the bail 50 are rotated. At the same time, the smaller driving gear 14 drives the oscillating gear 17, such that the driver element 19, by the engagement of the eccentric pin 17a in the vertical groove therein, is moved back and forth so as to oscillate the spindle 21 and, thus, the line spool 22 in the longitudinal direction of the spindle. The spindle 21 and the line spool 22 are however not rotated during line retrieve. The fishing line runs over the line roller 56 on the folded-in bail 50 and is wound onto the line spool 22 during the rotation of the bail. Since the line spool 22 is oscillated during the line winding operation, the line is distributed axially across the line spool.

Before a cast is to be made, the bail 50 is pivoted to the folded-out position so as to release the line from the line roller 56. During the cast, the line is paid out from the line spool 22 which, like the rotor 40, remains still during the cast. When line retrieve is again to be effected after the cast, the bail 50 is automatically swung back to the folded-in position, and the line is placed on the line roller 56.

The bail 50 can be seized with one hand for pivoting from the folded-in position to the folded-out position. Preferably, the bail 50 is however swung to the folded-out position before a cast by means of a trigger mechanism 60 mounted on the attachment 48 and engaging the mounting element 51.

The trigger mechanism 60 comprises an angle arm 61, one leg of which is rotatably connected to the mounting element 51 by a screw 62 screwed in a sleeve 63 extending through an eccentrically located hole 64 in the mounting element 51. The angle arm 61 has a longitudinal groove 65 in its other leg. The trigger mechanism 60 further comprises a trigger 66 pivotally connected to the attachment 48 by a screw 67 screwed in a hole 68 in one side wall of the attachment 48. On its side facing the attachment 48, the trigger 66 has a projection (not shown) engaging in the groove 65. When the trigger 66, is pivoted for instance by the index finger, a short distance away from the attachment 48 about its pivot shaft formed by the screw 67, the mounting element 51 will be rotated in such a direction that the bail 50 is swung to its folded-out position. The bail 50 is maintained in its folded-out position, as in its folded-in position, by a torque spring 69 mounted in the attachment 48 underneath a cover 71 fixed thereto by a screw 70. When the trigger 66 is released, it is returned to its initial position by a spring 72, so that its projection moves freely in the groove 65 without returning the mounting element 51.

In order to bring the trigger 66 into a suitable position for index-finger actuation prior to a cast, the handle 5 is turned in the direction opposite to the direction of line retrieve P, the rotor shaft 28 and, thus, the ring 38 non-rotatably mounted thereon being rotated until the stop lug 39 encounters the pawl 15b and further rotation of the handle 5 in the direction opposite to the direction of line retrieve P thus is prevented. In this stop position, the trigger 66 is in a suitable position for index-finger actuation, which is the position shown in FIG. 1.

The above-mentioned automatic return of the bail 50 to its folded-in position as soon as line retrieve is commenced after a cast, is brought about by means of a return mechanism 73. The mechanism 73 comprises a spring-loaded angle arm 74 provided within the cylinder part 43, and a lever 75 provided in the attachment 49 underneath a cover 77 fixed thereto by a screw 76. The angle arm 74 is rotatably mounted on the wall 45 separating the cylinder parts 43 and 44 from each other, by means of a screw 78 defining an axis of rotation for the angle arm parallel to the spindle 21. One leg of the angle arm 74 extends through a slot (not shown) in the wall of the cylinder part 43 into the attachment 49 while its other leg is located in the cylinder part 43 for cooperating with a cam curve 80, provided with a wear plate 79, on the fixed sleeve 36. The lever 75 is rotatable about a pin 81 parallel to the screw 54 about which the mounting element 52 is rotatable. The mounting element 52 has an eccentrically disposed projection 82 cooperating with one lever arm of the lever 75. The other lever arm of the lever 75 cooperates with the leg of the angle arm 74 extending into the attachment 49. When line retrieve is commenced after a cast, the rotor 40 is rotated, the cam curve 80 acting on the angle arm 74 which in turn acts on the lever 75 in such a direction that, by cooperating with the projection 82, it will pivot the bail 50 to its folded-in position.

In the known fishing reel described above, the trigger mechanism suffers from the shortcoming, as stated by way of introduction, of being rather complicated to mount and dismount.

An open-face fishing reel of the fixed-spool type provided with a trigger mechanism according to the present invention will now be described in more detail with reference to FIGS. 2-7. FIG. 2, corresponding to FIG. 1, illustrates only that part of the fishing reel which is of particular interest in the present invention. The components of the fishing reel not shown in FIG. 2 and not described in more detail with reference to FIGS. 2-7 are essentially similar to the corresponding components in the fishing reel of FIG. 1.

The attachment 48 of the fixed-spool type fishing reel according to FIG. 2 is so designed as to form an open chamber 100 and has a cover plate 101 detachably mounted over the chamber. In its front wall, the chamber 100 has a recess 102, and the cover plate 101 is provided on its underside with a mating lug 103 engaging in the recess 102. The cover plate 101 is fixed to the attachment 48 by a screw 104 extending through a hole 105 in the cover plate and screwed in a threaded bore in a base 106 provided in the chamber 100 adjacent one side wall thereof.

At its front portion, the cover plate 101 has a circular recess (not shown) which is formed in the underside of the cover plate and whose center is positioned on the pivot axis of the bail 50. A hole 107 extends through the cover plate 101 at the center of the circular recess. Behind the hole 107, the cover plate 101 has a circular-arc-shaped slot 108 whose center of curvature is also positioned on the pivot axis of the bail 50 and whose circumferential extent is about 150°.

A rotary disc 109 whose thickness is equal to the depth of the circular recess and whose diameter is essentially equal to the diameter of the circular recess is mounted therein. The rotary disc 109 has a center hole 110 whose diameter is smaller than that of the hole 107, and a driver pin 111 rising through the slot 108. A damping rubber sleeve 112 is mounted on the pin 111 and extends over the portion thereof which is located in the slot 108.

The mounting element 51 is connected to the attachment 48 by means of a rivet 113 corresponding to the screw 53 in FIG. 1. The rivet 113 passes through a hole 114 in the mounting element 51, the hole 107 in the cover plate 101 and the hole 110 in the rotary disc 109 so as to connect the mounting element 51, the cover plate 101 and the rotary disc 109 to each other. In its underside, the mounting element 51 has a dead hole 115 (FIG. 7) in which the driver pin 111 engages.

On its underside, the rotary disc 109 has a downwardly projecting pin 116 riveted in a hole 117 provided in the rotary disc adjacent the periphery thereof. On its underside, the cover plate 101 has a corresponding pin 118 located in the rear part of the cover plate. A tension spring 119 is mounted between these two pins.

The rotary disc 109 is rotatable between a first position in which the driver pin 111 with its rubber sleeve 112 engages one end wall of the slot 108 (FIG. 3) and which corresponds to the folded-in position of the bail 50, and a second position in which the driver pin 111 with its rubber sleeve 112 engages the other end wall of the slot 108 (FIG. 6) and which corresponds to the folded-out position of the bail 50. The rotary disc 109 is maintained in its two end positions by the tension spring 119.

A link arm 120 having a through hole 121 in its front portion is provided under the rotary disc 109 between this and the spring 119. The pin 116 of the rotary disc 109 passes through the hole 121 in the link arm 120 which is retained on the pin by means of a collar 116' formed thereon. The link arm 120 has a rearwardly projecting shank 120a engaging the pin 118, and a downwardly projecting rear shank 120b.

As appears, the parts held together by the rivet 113, i.e. the mounting element 51, the cover plate 101 and the rotary disc 109, as well as the components mounted on these parts, form a unit.

A rear base 122 is provided in the chamber 100 behind the base 106 and forms a rear wall in the chamber. This rear wall however extends only through part of the width of the chamber 100. Thus, the chamber 100 is open rearwards by an opening 123 defined between the base 122 and the opposite side wall of the chamber 100. Each of the side walls of the chamber 100 has an external groove 124 extending from the rear side of the attachment 48 a certain distance forwards along the respective side wall.

The illustrated trigger mechanism according to the present invention has a support element 125 with a rectangular base plate 126 having a front part-circular recess 127 for the mounting element 51. Two parallel flanges 128 extend upwards from the base plate 126. The flanges 128 carry between them a pivot pin 129 on which a trigger 130 is pivotally mounted. The trigger 130 is a key provided in its rear portion with a through hole 131 through which the pivot pin 129 passes. The pivot pin 129, defining the pivot axis of the trigger 130, is perpendicular both to the bail axis defined by the screw 54 and the rivet 113, and to the axis of the rotor 40. The trigger 130 is pivotable between an inner, first position (FIGS. 3 and 4) and an outer, second position (FIGS. 6 and 7).

In its rear portion, the trigger 130 has downwardly projecting cam means 132 in the form of a lug 132 extending downwards into the chamber 100 through a recess in the base plate 126 and a rear recess 133 in the cover plate 101. A recess 134 is formed in one side of the lug 132. A spring 135 having a coil web and two resilient legs is mounted in the recess 134. The pivot pin 129 passes through the coil web of the spring. The spring engages the rear wall of the recess 134 with one leg and with the other leg the front boundary wall of the recess formed in the base plate 126, so as to load the trigger 130 towards its first position.

The base plate 126 has internal guides 136 inserted in the grooves 124. At its rear portion, the base plate 126 has a downwardly extending projection 137 fitting in the opening 123 so as to close it.

In the illustrated Example, the unit consisting of the support element 125, the pin 129 and the trigger 130 is mounted on the attachment 48 by means of a screw 138 which passes through a hole (not shown) in the base plate 126 of the support element 125 and a hole 139 in the cover plate 101 and is screwed in a threaded bore in the rear base 122.

When the trigger 130 is in its inner, first position and the mounting element 51 is in its position of rotation which corresponds to the folded-in line-winding position of the bail 50 and in which it is retained by the tension spring 119, the lug 132 of the trigger 130 and the shank 120b of the link arm 120 engage each other, as shown in FIGS. 3 and 4. When the trigger 130 is pivoted outwards, e.g. with the index finger, to its outer, second position, the lug 132 pushes the link arm 120 forwards, so that the rotary disc 109 is turned, entraining the mounting element 51 so as to be rotated to its position of rotation which corresponds to the folded-out position of the bail 50 and in which it is also retained by the tension spring 119 (FIGS. 6 and 7). When the trigger 130 is released, it is returned by the spring 135 to its first position. However, the mounting element 51 is rotated back and, by the intermediary of the rotary disc 109, moves the link arm 120 backwards only when the bail 50 is folded in to its line-winding position.

When the unit 125, 129, 130 should be dismounted from the fishing reel, the screw 138 is removed and the unit is thereafter drawn off the attachment 48. A rectangular weight-compensating or counterbalancing plate 140 is thereafter mounted on the attachment 48 where the unit 125, 129, 130 was previously provided. The plate 140 is designed in the same way as the base plate 126 and thus has a front part-circular recess 141, a rear downwardly extending projection 142 fitting in the opening 123, a through hole 143 for the screw 138 and internal guides 144 which are inserted in the grooves 124 in the side walls of the chamber 100. The plate 140 is mounted on the attachment 48 by means of the screw 138.

What I claim and desire to secure by Letters Patent is:

1. A trigger mechanism in an open-face fishing reel of the fixed-spool type having a housing, a rotor mounted on said housing, a line spool coaxial with said rotor and adapted to oscillate in the axial direction, and a bail mechanism having a bail for winding a line onto said line spool, two attachments arranged on said rotor substantially diametrically opposite each other, and two mounting elements carrying said bail and being so rotatably mounted on a respective one of said attachments that said bail is pivotable about a bail axis substantially at right angles to the axis of said rotor, between a folded-in line-winding position and a folded-out position in which said bail is released of the line, a one of said attachments being designed so as to form an open chamber and having a cover plate detachably mounted over said chamber and supporting the corresponding mounting element on its side facing away from said chamber, said trigger mechanism comprising a support element releasably mounted on said one attachment;

a trigger pivotally mounted on said support element about a pivot axis at right angles to the rotor axis and to the bail axis, to be pivoted between a first position and a second position, said support element and said trigger being detachable as a unit from said one attachment;

driver means eccentrically engaging the mounting element carried by said cover plate through a slot in the cover plate; and cam means provided on said trigger in order, during pivotal movement of the trigger from said first position to said second position and in cooperation with said driver means, to rotate said mounting element from its position of rotation corresponding to the folded-in line-winding position of said bail, to its position of rotation corresponding to said folded-out position of said bail.

2. Mechanism as claimed in claim 1, wherein said support element is provided outside said cover plate and wherein said cover plate has a recess through which said cam means extends into said chamber.

3. Mechanism as claimed in claim 1, wherein said, one attachment has grooves formed therein and said support element has guides for engaging in said grooves, said grooves and said guides being so designed that said support element with said trigger mounted thereon can be pushed onto and pulled off from said one attachment.

4. Mechanism as claimed in claim 1, wherein said driver means comprises a rotary disc which on its side facing away from said chamber has an eccentric driver pin passing through said slot in said cover plate into engagement with said mounting element, and a link arm eccentrically connected at one end to said rotary disc and designed at its other end for cooperation with said cam means.

* * * * *